US007599565B2

(12) United States Patent
Kurceren et al.

(10) Patent No.: US 7,599,565 B2
(45) Date of Patent: *Oct. 6, 2009

(54) METHOD AND DEVICE FOR TRANSFORM-DOMAIN VIDEO EDITING

(75) Inventors: Ragip Kurceren, Carrollton, TX (US); Fehmi Chebil, Irving, TX (US); Asad Islam, Richardson, TX (US)

(73) Assignee: Nokia Corporation, Epsoo (FI)

( * ) Notice: Subject to any disclaimer, the term of this patent is extended or adjusted under 35 U.S.C. 154(b) by 721 days.

This patent is subject to a terminal disclaimer.

(21) Appl. No.: 10/798,825

(22) Filed: Mar. 10, 2004

(65) Prior Publication Data
US 2005/0201467 A1 Sep. 15, 2005

(51) Int. Cl.
*G06K 9/46* (2006.01)
(52) U.S. Cl. .................. 382/238; 382/236; 375/240.12
(58) Field of Classification Search .................. 382/238
See application file for complete search history.

(56) References Cited

U.S. PATENT DOCUMENTS

| 6,104,441 | A | 8/2000 | Wee et al. ............... 348/722 |
| 6,151,359 | A | 11/2000 | Acer et al. ............... 375/240 |
| 6,301,428 | B1 | 10/2001 | Linzer ............... 386/52 |
| 6,310,915 | B1* | 10/2001 | Wells et al. ............ 375/240.03 |
| 6,314,139 | B1 | 11/2001 | Koto et al. ............ 375/240.12 |
| 6,445,828 | B1 | 9/2002 | Yim ............... 382/250 |
| 6,831,949 | B1* | 12/2004 | Brightwell et al. ..... 375/240.12 |
| 7,236,520 | B2* | 6/2007 | Kim et al. ............ 375/240.01 |
| 2005/0201467 | A1* | 9/2005 | Kurceren et al. ....... 375/240.18 |
| 2006/0050787 | A1* | 3/2006 | Winger ............ 375/240.12 |
| 2009/0080530 | A1* | 3/2009 | Chujoh et al. .......... 375/240.16 |

FOREIGN PATENT DOCUMENTS

| WO | WO 99/18735 A1 | 4/1999 |
| WO | WO 02/058401 A1 | 7/2002 |

OTHER PUBLICATIONS

IEEE Journal on Selected Areas in Communications, vol. 13, No. 1, 0733-8716/95; S. Chang et al.; "Manipulation and Compositing of MC-DCT Compressed Video"; pp. 1-10; 1995.*
IEEE 0-7803-6297-7/00; Egawa et al.; "Compressed Doman MPEG-2 Video Editing with VBV Requirement"; pp. 1016-1019; 2000.
IEEE Computer Graphics & Applications, 0272-17-16/93; B. Smith et al.; "Algorithms for Manipulating Compressed Images"; pp. 34-42; 1993.
IEEE 0-7803-6297-7/00; A. Yoneyama et al.; "Fast Dissolve Operations for MPEG Video Contents"; pp. 291-294; 2000.

* cited by examiner

*Primary Examiner*—Matthew C. Bella
*Assistant Examiner*—Sath V. Perungavoor
(74) *Attorney, Agent, or Firm*—Ware, Fressola, Van Der Sluys & Adolphson, LLP

(57) ABSTRACT

A method and device for editing video data to achieve a video effect in a video sequence. From an encoder, transform coefficients of part of the video sequence are obtained. The transform coefficients are mixed with other transform coefficients in a combining module. The output of the combining module is quantized and further processed to provide an edited video bitstream. In the combining module, transform coefficients are multiplied with weighting parameters to achieve different video effects. Furthermore, logo data from a memory can be transformed into further transform coefficients for mixing in order to achieve a logo insertion effect. Moreover, prediction error and motion compensation information obtained from video data can be used to provide a reference frame, and the transform data from the reference frame can be used for mixing to achieve a blending effect.

21 Claims, 10 Drawing Sheets

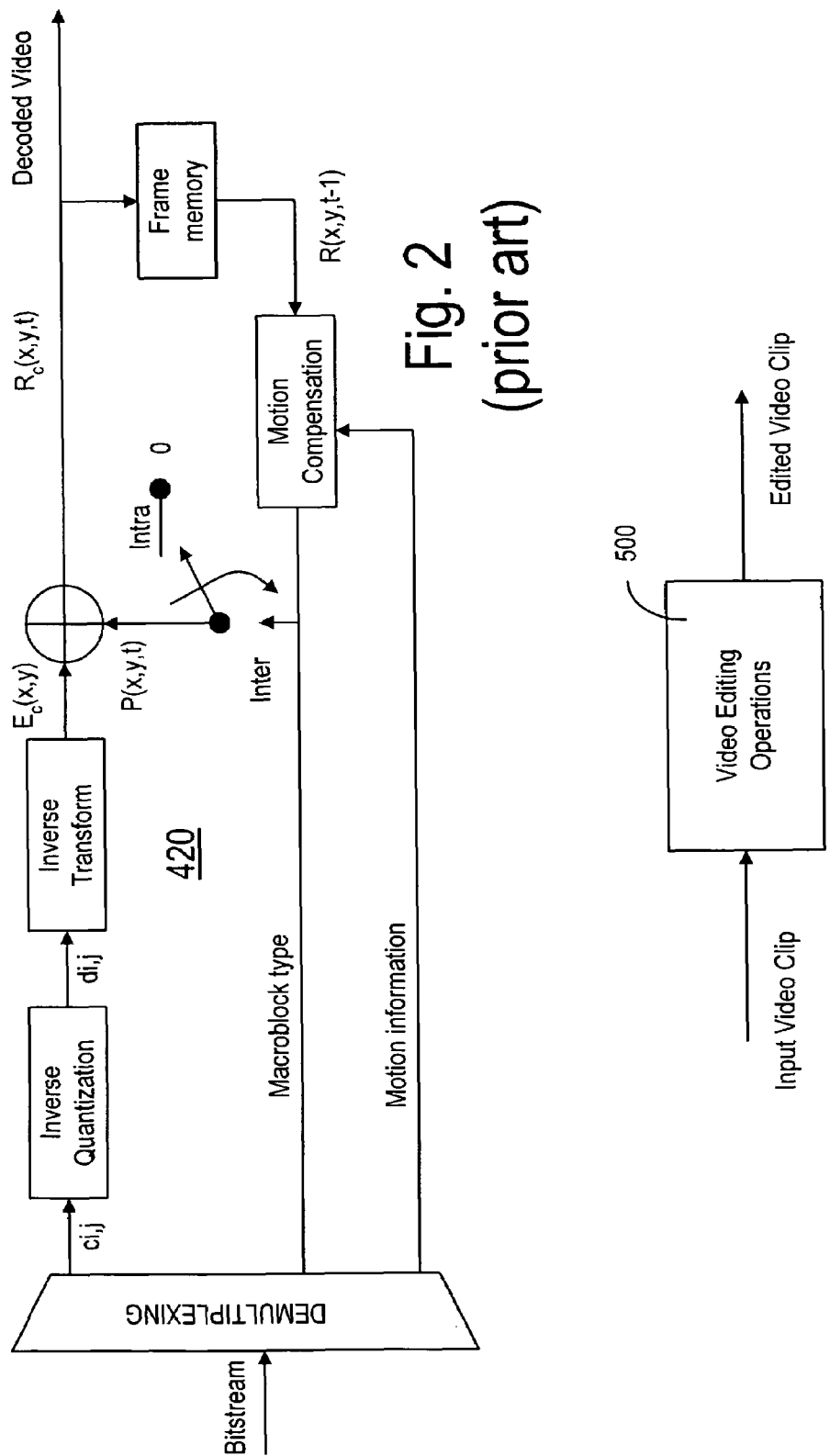

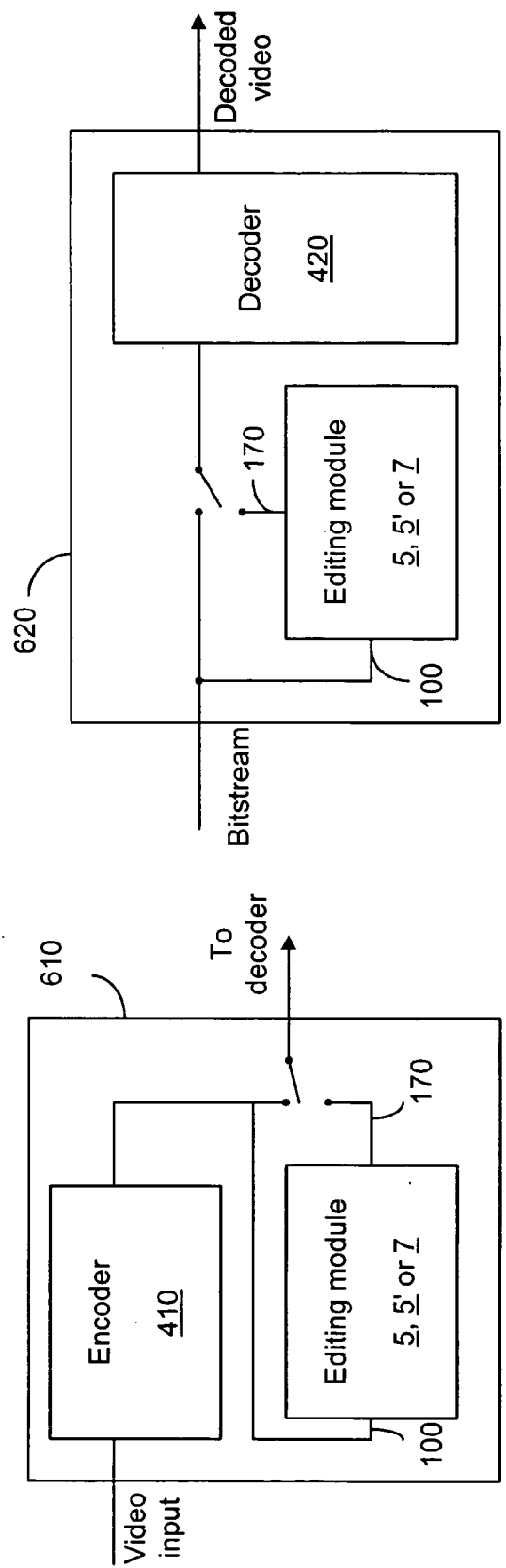

METHOD AND DEVICE FOR TRANSFORM-DOMAIN VIDEO EDITING

CROSS REFERENCES TO RELATED PATENT APPLICATIONS

The present patent application is related to U.S. patent application Ser. No. 10/737,184, filed Dec. 16, 2003, assigned to the assignee of the present patent application. The present invention is also related to U.S. patent application Ser. No. 10/798,824, assigned to the assignee of the present application, filed even date herewith.

FIELD OF THE INVENTION

The present invention relates generally to video coding and, more particularly, to video editing.

BACKGROUND OF THE INVENTION

Video editing capability is an increasingly requested feature in video playing and/or capturing devices. Transitional effects between different video-sequences, logo insertion and over-layering sequences are among the most widely used operations in editing. Video editing tools enable users to apply a set of effects on their video clips aiming to produce a functionally and aesthetically better representation of their video.

To apply video editing effects on video sequences, several commercial products exist. These software products are targeted mainly for the PC platform. Because processing power, storage and memory constraints are not an issue in the PC platform today, the techniques utilized in such video-editing products operate on the video sequences mostly in their raw formats in the spatial domain. With such techniques, the compressed video is first decoded and then the editing effects are introduced in the spatial domain. Finally, the video is again encoded. This is known as spatial domain video editing operation.

For devices with low resources in processing power, storage space, available memory and battery power, decoding a video sequence and re-encoding it are costly operations that take a long time and consume a lot of battery power. Many of the latest communication devices, such as mobile phones, communicators and PDAs, are equipped with video cameras, offering users the capability to shoot video clips and send them over wireless networks. It is advantageous and desirable to allow users of those communication devices to generate quality video at their terminals. The spatial domain video editing operation is not suitable in wireless cellular environments.

As mentioned above, most video effects are performed in the spatial domain in prior art. In the case of video blending (transitional effects for fading, etc.) between two or more sequences, for instance, video clips are first decompressed and then the effects are performed according to the following equation:

$$\tilde{V}(x,y,t)=\alpha_1 V_1(x,y,t)+\alpha_2 V_2(x,y,t) \quad (1)$$

where $\tilde{V}(x,y,t)$ is the edited sequence from the original sequences $V_1(x,y,t)$ and $V_2(x,y,t)$. $\alpha_1$ and $\alpha_2$ are two weighting parameters chosen according to the desired effect. Equation (1) is applied in the spatial domain for the various color components of the video sequence depending on the desired effect.

Finally, the resulting edited image sequence is re-encoded. The major disadvantage of this approach is that it is significantly computationally intensive, especially in the encoding part. Typical complexity ratio between generic encoders and decoders is approximately four. Using this conventional spatial-domain editing approach, all of the video frames coming right after the transition effect in the second sequence must be re-encoded.

Furthermore, it is not unusual that editing operations are usually repeated several times by users before the desired result is achieved. The repetition adds to the complexity of the editing operations, and requires more processing power. It is therefore important to develop efficient techniques minimizing the decoding and encoding operations, functioning in the compressed domain, to perform such editing effects.

In order to perform efficiently, video compression techniques exploit spatial redundancy in the frames forming the video. First, the frame data is transformed to another domain, such as the Discrete Cosine Transform (DCT) domain, to decorrelate it. The transformed data is then quantized and entropy coded.

In addition, the compression techniques exploit the temporal correlation between the frames: when coding a frame, utilizing the previous, and sometimes the future, frames(s) offers a significant reduction in the amount of data to compress.

The information representing the changes in areas of a frame can be sufficient to represent a consecutive frame. This is called prediction and the frames coded in this way are called predicted (P) frames or Inter frames. As the prediction cannot be 100% accurate (unless the changes undergone are described in every pixel), a residual frame representing the errors is also used to compensate the prediction procedure.

The prediction information is usually represented as vectors describing the displacement of objects in the frames. These vectors are called motion vectors. The procedure to estimate these vectors is called motion estimation. The usage of these vectors to retrieve frames is known as motion compensation.

Prediction is often applied on blocks within a frame. The block sizes vary for different algorithms (e.g. 8×8 or 16×16 pixels, or 2n×2m pixels with n and m being positive integers). Some blocks change significantly between frames, to the point that it is better to send all the block data independently from any prior information, i.e. without prediction. These blocks are called Intra blocks.

In video sequences there are frames, which are fully coded in Intra mode. For example, the first frame of the sequence is usually fully coded in Intra mode, because it cannot be predicted from an earlier frame. Frames that are significantly different from previous ones, such as when there is a scene change, are usually also coded in Intra mode. The choice of the coding mode is made by the video encoder. FIGS. 1 and 2 illustrate a typical video encoder 410 and decoder 420 respectively.

The decoder 420 operates on a multiplexed video bitstream (includes video and audio), which is demultiplexed to obtain the compressed video frames. The compressed data comprises entropy-coded-quantized prediction error transform coefficients, coded motion vectors and macro block type information. The decoded quantized transform coefficients $c(x,y,t)$, where x,y are the coordinates of the coefficient and t stands for time, are inversely quantized to obtain transform coefficients $d(x,y,t)$ according to the following relation:

$$d(x,y,t)=Q^{-1}(c(x,y,t)) \quad (3)$$

where $Q^{-1}$ is the inverse quantization operation. In the case of scalar quantization, equation (3) becomes $$d(x,y,t)=QPc(x,y,t) \qquad (4)$$

where QP is the quantization parameter. In the inverse transform block, the transform coefficients are subject to an inverse transform to obtain the prediction error $E_c(x,y,t)$:

$$E_c(x,y,t)=T^{-1}(d(x,y,t)) \qquad (5)$$

where $T^{-1}$ is the inverse transform operation, which is the inverse DCT in many compression techniques.

If the block of data is an intra-type macro block, the pixels of the block are equal to $E_c(x,y,t)$. In fact, as explained previously, there is no prediction, i.e.:

$$R(x,y,t)=E_c(x,y,t). \qquad (6)$$

If the block of data is an inter-type macro block, the pixels of the block are reconstructed by finding the predicted pixel positions using the received motion vectors $(\Delta_x,\Delta_y)$ on the reference frame $R(x,y,t-1)$ retrieved from the frame memory. The obtained predicted frame is:

$$P(x,y,t)=R(x+\Delta_x,y+\Delta_y,t-1) \qquad (7)$$

The reconstructed frame is $$R(x,y,t)=P(x,y,t)+E_c(x,y,t) \qquad (8)$$

In general, blending, transitional effects, logo insertion and frame superposition are editing operations which can be achieved by the following operation:

$$\tilde{V}(x,y,t) = \sum_{i=1}^{N} \alpha_i(x,y,t)V_i(x,y,t) \qquad (9)$$

where $\tilde{V}(x,y,t)$ is the edited sequence from the N $V_i(x,y,t)$ original sequences and t is the time index for which the effect would take place. The parameter $\alpha_i(x,y,t)$ represents the modifications for introducing on $V_i(x,y,t)$ for all pixels (x,y) at the desired time t.

For the sake of simplicity, we consider the case when N=2, i.e., the editing is performed using two input sequences. Nevertheless, it is important to stress that all of the following editing discussion can be generalized to n arbitrary input frames to produce one edited output frame.

For N=2, Equation (9) can be written as Equation (1):

$$\tilde{V}(x,y,t)=\alpha_1(x,y,t)V_1(x,y,t)+\alpha_2(x,y,t)V_2(x,y,t)$$

SUMMARY OF THE INVENTION

The present invention provides a method for compressed domain operation to achieve the desired editing effects, with reduced complexity reduction, starting substantially at any frame (at any time t). The method, according to the present invention, offers the possibility of changing the effect including regaining the original clip. In the editing device, according to the present invention, transform coefficients of a part of the video sequence are obtained from an encoder so that they can be combined with transform coefficients of other part of the video sequence, the transform coefficients of other video sequence or the transform coefficients indicative of a logo in order to achieve video effects, such as blending, sliding transitional and logo insertion.

Thus, the first aspect of the present invention provides a method for editing a bitstream carrying video data indicative of a video sequence. The method comprises:

acquiring from the bitstream data indicative of transform coefficients of at least part of the video sequence; and modifying the acquired data in the transform domain for providing modified data in a modified bitstream in order to achieve a video effect in said at least part of the video sequence.

According to present invention, the acquiring step includes:

decoding the bitstream for obtaining a plurality of quantized transform coefficients; and converting the quantized transform coefficients by inverse quantization for providing the transform coefficients.

According to the present invention, the modified data contain a plurality of quantized modified transform coefficients, and the modifying step includes changing the transform coefficients for providing a plurality of modified transform coefficients. The method further comprises:

quantizing the modified transform coefficients for providing said plurality of quantized modified transform coefficients.

According to the present invention, the method further comprises:

obtaining further data indicative of a plurality of further transform coefficients, and the modifying step includes combining the further data with the acquired data for providing the modified data, and the combining step includes:

multiplying the further data by a first weighting parameter for providing a first weighted data;

multiplying the acquired data by a second weighting parameter for providing a second weighted data; and summing the first weighted data and the second weighted data for providing the further data.

According to the present invention, one or both of the first and second weighting parameters are adjusted to achieve a blending effect, or a sliding transitional effect. The further data can be obtained from a memory device via a transform operation, or from the same or a different bitstream.

According to the present invention, the method further comprise:

decoding the bitstream for obtaining a plurality of quantized transform coefficients;

converting the quantized transform coefficient in an inverse quantization operation for obtaining a plurality of dequantized transform coefficients for use in said modifying;

inversely transforming the dequantized transform coefficients for obtaining information indicative of a prediction error;

combining the prediction error with motion compensation information in the video data for providing further video data indicative of a reference frame;

transforming the further video data for providing transformed reference data; and combining the transform reference data with the transform coefficient in said modifying.

According the present invention, the method further comprises:

obtaining a plurality of further transform coefficients from a memory device via a transform operation; and combining the further transform coefficients with the transform coefficient in said modifying.

The second aspect of the present invention provides a video editing device for editing a bitstream carrying video data indicative of a video sequence. The device comprises:

an acquiring module, responsive to the bitstream, for acquiring data indicative of transform coefficients of at least part of the video sequence; and a modification module, responsive to the acquired data, for changing the transform coefficients in the transform domain for providing modified data in a modified bitstream in order to achieve a video effect in said at least part of the video sequence.

According to the present invention, the acquiring module comprises:

a decoding module, responsive to the bitstream, for obtaining a plurality of quantized transform coefficients; and an inverse quantization module, responsive to the quantized transform coefficients, for providing the transform coefficients.

According to the present invention, the transform coefficients are changed in the transform domain to become modified transform coefficients by the modification module, and the editing device further comprises:

a quantization module for quantizing the modified transform coefficients for providing a plurality of quantized modified transform coefficients in the modified data.

According to the present invention, the editing device further comprises:

a further acquiring module for obtaining further data indicative of a plurality of further transform coefficients; and a combination module, for combining the acquired data and the further data for providing the modified data.

According to the present invention, the editing device further comprises:

a further acquiring module for obtaining further data indicative of a plurality of further transform coefficients;

an inverse transform module, responsive to the further data, for providing information indicative of a prediction error;

a combination module, responsive to the prediction error and motion compensation information in the video data, for providing reference data indicative of a reference frame; and a transform module, responsive to the reference data, for providing transformed reference data to the modification module so as to change the transform coefficient based on the transformed reference data.

The third aspect of the present invention provides a video coding system, which comprises:

a decoder; and an encoder for receiving a bitstream carrying video data indicative of a video sequence, wherein the encoder comprises a video editing device for editing the bitstream, wherein the editing device comprises:

an acquiring module, responsive to the bitstream, for acquiring data indicative of transform coefficients of at least part of the video sequence; and a modification module, responsive to the acquired data, for changing the transform coefficients in the transform domain for providing modified data in a modified bitstream in order to achieve a video effect in said at least part of the video sequence, and wherein the decoder is operable in a first mode for reconstructing video from the video data carried in the bitstream, and in a second mode for reconstructing video from the modified data in the modified bitstream.

The fourth aspect of the present invention provides an electronic device, which comprises:

a video data acquisition module for acquiring a bitstream carrying a video sequence having video data; and a video editing device for editing the bitstream to achieve a video effect, wherein the editing device comprises:

a first module for obtaining from the bitstream transform coefficients of at least a part of the video sequence;

a second module for modifying the transform coefficients in the transform domain for providing modified transform coefficients; and a third module for converting the modified transform coefficients into modified video data in a modified bitstream.

The fifth aspect of the present invention provides a software product for use in a video editing device for editing a bitstream carrying video data indicative of a video sequence. The software product comprises:

a code for extracting from the bitstream data indicative of a plurality of transform coefficients of at least part of the video sequence; and a code for modifying the transform coefficients for provided modified data indicative of the modified transform coefficients.

The software product further comprises:

a code for mixing the transform coefficients of said at least part of the video sequence with other transform coefficients.

According to the present invention, the code for extracting comprises:

a code for decoding the bitstream for obtaining a plurality of quantized transform coefficients; and a code for converting the quantized transform coefficients by inverse quantization for providing the transform coefficients.

According to the present invention, the code for modifying comprises:

a code for changing the transform coefficients for providing a plurality of modified transform coefficients, said software product further comprising:

a code for quantizing the modified transform coefficients for providing a plurality of quantized modified transform coefficients in a modified bitstream.

According to the present invention, the code for mixing comprises:

a code for multiplying the transform coefficients by a first weighting parameter for providing a first weighted data, and multiplying the other transform coefficients by a second weighting parameter for providing a second weighted data; and a code for summing the first weighted data with the second weighted data for providing the modified data.

According to the present invention, the software product comprises:

a code for extracting stored data from a memory for providing further data; and a code for transforming the further data for providing the other transform coefficients.

According to the present invention, the software product comprises:

a code for decoding the bitstream for obtaining a plurality of quantized transform coefficients; and a code for converting the quantized transform coefficient in an inverse quantization operation for obtaining a plurality of the dequantized transform coefficients;

a code for inversely transforming the dequantized transform coefficients for obtaining information indicative of a prediction error;

a code for combining the prediction error with motion compensation information in the video data for providing further video data indicative of a reference frame;

a code for transforming the further video data for providing transformed reference data; and a code for mixing the transform reference data with the transform coefficient for providing the modified data.

The present invention will become apparent upon reading the description taken in conjunction with FIGS. 3-13.

BRIEF DESCRIPTION OF THE DRAWINGS

FIG. 2 a block diagram illustrating a prior art video decoder process.

FIG. 3 is a schematic representation showing a typical video-editing channel.

FIG. 8 is a block diagram showing an expanded video encoder, which can be used for compressed-domain video editing, according to the present invention.

FIG. 9 is a block diagram showing an expanded video decoder, which can be used for compressed-domain video editing, according to the present invention.

DETAILED DESCRIPTION OF THE INVENTION

The present invention is mainly concerned with transitional effects between different video sequences, logo insertion and overlaying of video sequences while the sequences are in compressed format. As such, the editing effects are applied to the video sequences without requiring full decoding and re-encoding. Thus, the present invention is concerned with blending and logo insertion operations in video editing. Blending is the operation of combining or joining sequences, overlaying for the entire frames or part of the frames in the sequences. Logo insertion is the operation of inserting a logo, which can be an image or graphic at a particular area of the frames in the video sequences.

Transition effect editing between two frames can be broken down to performing such operations between the corresponding macroblocks of these two frames. As explained above macro blocks in compressed video are of two types: Intra and Inter. Hence, we find four different combinations for applying editing effects between the macroblocks. We will present how to achieve the above effects with combinations of these macroblocks.

In general, editing operations can happen on a video clip in a channel at one of its terminals. The edited video clip is outputted at the other terminal, as shown in FIG. 3. Video editing operations can start at time t. From that time, the bitstream is modified in order to add the desired effects as described in the following.

Blending of an Intra Block with an Intra Block

This operation in spatial domain is performed as follows:

$$\tilde{I}(x,y,t)=\alpha_1(t)I_1(x,y,t)+\alpha_2(t)I_2(x,y,t)$$

For Intra frames, using the steps of the earlier section, we have, $$\tilde{V}(x,y,t)=\alpha_1(t)E_1(x,y,t)+\alpha_2(t)E_2(x,y,t) \qquad (10)$$

For Intra frames, using the steps of the earlier section, and after taking the transform of the frame after special effects, the same operations can be formulated as follows in the compressed domain:

$$\tilde{e}(x,y)=\alpha_1(t)d_1(x,y)+\alpha_2(t)d_2(x,y) \qquad (11)$$

Figure 4:
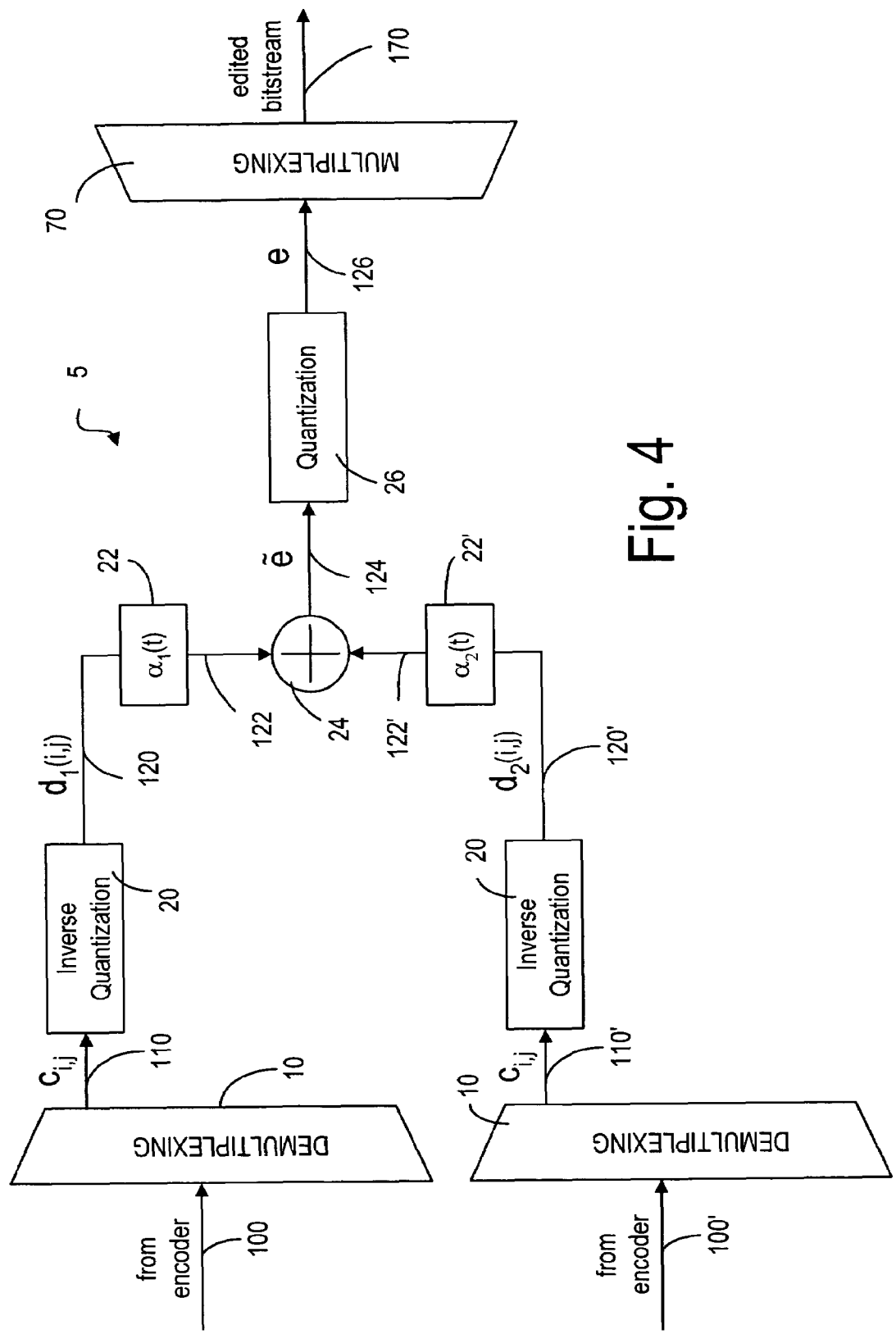
FIG. 4 is a block diagram illustrating an embodiment of the compressed domain approach to dissolve effects for intra frames, according to the present invention.

The transform domain approach significantly simplifies the blending operations, as can be seen from FIG. 4.

FIG. 4 illustrates an embodiment of the present invention for compressed domain solution to dissolve transitional effects for Intra frames. Both of the compressed bitstreams 100, 100' are partially decoded in the corresponding demultiplexing units 10 to obtain the quantized transform coefficients 110, 100' or c(i,j). The quantized transform coefficients are inverse quantized in inverse quantization blocks 20 to obtain inverse quantized transform coefficients 120, or $d_1(i,j)$ and 120' or $d_2(i,j)$. Each of these coefficients $d_1(i,j)$ and $d_2(i,j)$ are scaled with $\alpha_1(t)$ and $\alpha_2(t)$, respectively, in blocks 22 and 22' to become scaled coefficients 122, 122'. The resulting coefficients 122, 122' are then summed by a summing device 24 to produce a weighted sum 124 ($d_{12}$ or (x,y), see Equation 11). The weighted sum 124 is re-quantized in the quantization block 26 to produce quantized coefficients 126, or e(x,y). Finally the quantized coefficients 126 are sent to a multiplexing unit 70, which performs entropy coding and multiplexing with other required information to produce a valid compressed video bitstream 170.

It should be understood that it is possible to combine the inverse quantization, scaling and quantization blocks or to combine the scaling and quantization blocks into a single coding block.

This process is repeated for both luminance and chrominance components of the video bitstream.

Blending of an Inter Block with an Inter Block.

Inter-frames are reconstructed by summing residual error with the motion-compensated prediction, $$V_1(x,y,t)=R_1(x+\Delta_{x1},y+\Delta_{y1},t-1)+E_1(x,y)$$

and similarly, $$V_2(x,y,t)=R_2(x+\Delta_{x2},y+\Delta_{y2},t-1)+E_2(x,y)$$

The spatial domain representation of dissolve effect is formulated as follows:

$$\tilde{V}(x,y,t)=\alpha_1(t)(R_1(x+\Delta_{x1},y+\Delta_{y1},t-1)+E_1(x,y))+\\ \alpha_2(t)(R_2(x+\Delta_{x2},y+\Delta_{y2},t-1)+E_2(x,y))$$

$$\tilde{V}(x,y,t) = \alpha_1(t)E_1(x,y) + \alpha_2(t)E_2(x,y) + \alpha_1(t)R_1(x+\Delta_{x1},y+\Delta_{y1},t-1) + \alpha_2(t)R_2(x+\Delta_{x2},y+\Delta_{y2},t-1)$$

Note that $\tilde{V}(x+\Delta_{x1},y+\Delta_{y1},t-1)$ is the previously reconstructed frame after the fading effects, and it can be re-written in terms of $R(x+\Delta_{x1},y+\Delta_{y1},t-1)$, which represents the frame that would have been reconstructed if transitional effects were not applied:

$$\tilde{V}(x+\Delta_{x1},y+\Delta_{y1},t-1) = \alpha_1(t-1)(R_1(x+\Delta_{x1},y+\Delta_{y1},t-1) + \alpha_2(t-1)R_2(x+\Delta_{x1},y+\Delta_{y1},t-1))$$

Then the prediction residual can be calculated by:

$$F(x,y,t) = \tilde{V}(x,y,t) - \tilde{V}(x+\Delta_{x1},y+\Delta_{y1},t-1)$$

$$F(x,y,t) = \alpha_1(t)E_1(x,y) + \alpha_2(t)E_2(x,y) + \alpha_1(t)R_1(x+\Delta_{x1},y+\Delta_{y1},t-1) + \alpha_2(t)R_2(x+\Delta_{x2},y+\Delta_{y2},t-1) - \alpha_1(t-1)R_1(x+\Delta_{x1},y+\Delta_{y1},t-1) - \alpha_2(t-1)R_2(x+\Delta_{x1},y+\Delta_{y1},t-1)$$

$$F(x,y,t) = \alpha_1(t)E_1(x,y) + \alpha_2(t)E_2(x,y) - (\alpha_1(t-1) - \alpha_1(t))R_1(x+\Delta_{x1},y+\Delta_{y1},t-1) - \alpha_2(t-1)R_2(x+\Delta_{x1},y+\Delta_{y1},t-1) + \alpha_2(t)R_2(x+\Delta_{x2},y+\Delta_{y2},t-1) \quad (12)$$

Taking the transform of new residual data, we have the blending effect of two inter blocks in the transform domain:

$$\tilde{e}(x,y) = \alpha_1(t)d_1(x,y) + \alpha_2(t)d_2(x,y) - (\alpha_1(t-1) - \alpha_1(t))T(R_1(x+\Delta_{x1},y+\Delta_{y1},t-1)) - \alpha_2(t-1)T(R_2(x+\Delta_{x1},y+\Delta_{y1},t-1)) + \alpha_2(t)T(R_2(x+\Delta_{x2},y+\Delta_{y2},t-1)) \quad (13)$$

Blending of an Intra Block with an Inter Block

The spatial domain representation of dissolve effect can be formulated as follows:

$$\tilde{V}(x,y,t) = \alpha_1(t)E_1(x,y) + \alpha_2(t)(R_2(x+\Delta_{x2},y+\Delta_{y2},t-1) + E_2(x,y)),$$

or $$\tilde{V}(x,y,t) = \alpha_1(t)E_1(x,y) + \alpha_2(t)E_2(x,y) + \alpha_2(t)R_2(x+\Delta_{x2},y+\Delta_{y2},t-1) \quad (14)$$

Since the output is an intra block, i.e., no prediction, the transform of the block is given by, $$\tilde{e}(x,y,t) = \alpha_1(t)d_1(x,y) + \alpha_2(t)d_2(x,y) + \alpha_2(t)T(R_2(x+\Delta_{x2},y+\Delta_{y2},t-1)) \quad (15)$$

Equation (15) gives the result of blending an intra block with an inter block in the transform domain.

Blending of an Inter Block with an Intra Block

The spatial domain representation of dissolve effect is then formulated as follows:

$$\tilde{V}(x,y,t) = \alpha_1(t)(R_1(x+\Delta_{x1},y+\Delta_{y1},t-1) + E_1(x,y)) + \alpha_2(t)E_2(x,y),$$

or $$\tilde{V}(x,y,t) = \alpha_1 E_1(x,y) + \alpha_2(t)E_2(x,y) + \alpha_1(t)R_1(x+\Delta_{x1},y+\Delta_{y1},t-1)$$

Again $\tilde{V}(x+\Delta_{x1},y+\Delta_{y1},t-1)$ is the previously reconstructed frame after fading effects and can be re-written in terms of $R(x+\Delta_{x1},y+\Delta_{y1},t-1)$, which represents the frame that would have been reconstructed if transition effects are not applied:

$$\tilde{V}(x+\Delta_{x1},y+\Delta_{y1},t-1) = \alpha_1(t-1)(R_1(x+\Delta_{x1},y+\Delta_{y1},t-1) + \alpha_2(t-1)R_2(x+\Delta_{x1},y+\Delta_{y1},t-1))$$

The prediction residual can be calculated by:

$$F(x,y,t) = \tilde{V}(x,y,t) - \tilde{V}(x+\Delta_{x1},y+\Delta_{y1},t-1)$$

$$F(x,y,t) = \alpha_1(t)E_1(x,y) + \alpha_2(t)E_2(x,y) + \alpha_1(t)R_1(x+\Delta_{x1},y+\Delta_{y1},t-1) - \alpha_1(t-1)R_1(x+\Delta_{x1},y+\Delta_{y1},t-1) - \alpha_2(t-1)R_2(x+\Delta_{x1},y+\Delta_{y1},t-1)$$

$$F(x,y,t) = \alpha_1(t)E_1(x,y) + \alpha_2(t)E_2(x,y) - (\alpha_1(t-1) - \alpha_1(t))R_1(x+\Delta_{x1},y+\Delta_{y1},t-1) - \alpha_2(t-1)R_2(x+\Delta_{x1},y+\Delta_{y1},t-1) \quad (16)$$

Taking the transform of new residual data, we have the effect of blending an inter block with an intra block:

$$e(x,y) = \alpha_1(t)d_1(x,y) + \alpha_2(t)d_2(x,y) - (\alpha_1(t-1) - \alpha_1(t))T(R_1(x+\Delta_{x1},y+\Delta_{y1},t-1)) - \alpha_2(t-1)T(R_2(x+\Delta_{x1},y+\Delta_{y1},t-1)) \quad (17)$$

Blending of an Inter Block with an Intra Block for the First Intra Frame

This is a special case of blending an intra block on inter blocks, applied to the first intra frame. Note that this case can be expressed by $\alpha_2(t-1)=0$. The rest of the process follows the analysis. By applying $\alpha_2(t-1)=0$ to Equation (17), we obtain the final residual coefficients in the transform domain as follows:

$$\tilde{e}(x,y) = \alpha_1(t)d_1(x,y) + \alpha_2(t)d_2(x,y) - (\alpha_1(t-1) - \alpha_1(t))T(R_1(x+\Delta_{x1},y+\Delta_{y1},t-1)) \quad (18)$$

These transform coefficients $e(x,y)$ are then quantized and sent to the entropy coder.

Figure 5:
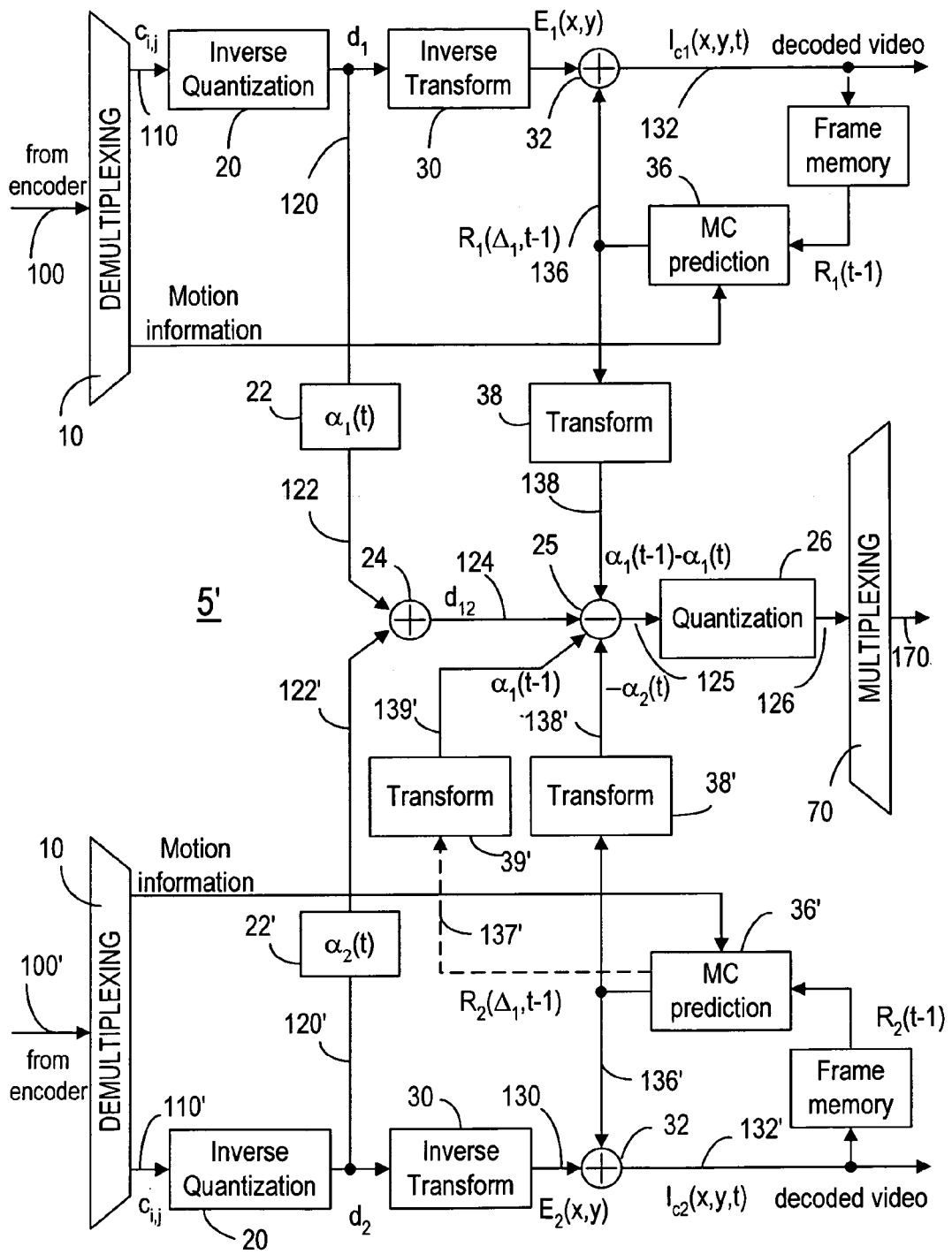
FIG. 5 is a block diagram illustrating an embodiment of the compressed domain approach to dissolve effects for inter frames, according to the present invention.

FIG. 5 demonstrates an embodiment of the present invention for compressed domain solution to dissolve transitional effects for Inter macroblocks with Inter macroblocks. As shown in FIG. 5, the coding device 5' comprises two decoders, which are capable of decoding two compressed bitstreams 100, 100' into decoded video sequences 132, 132'. Part of the decoders is similar to a conventional decoder for inter block decoding, as shown in FIG. 2. Thus, the process of decoding the compressed bitstreams 100, 100' into the decoded video sequences 132, 132' in the spatial domain can be carried out in a conventional fashion. However, the coding device 5' further comprises a number of processing blocks to produce special dissolve effects in an edited bitstream 170, in addition to the decoded video sequences 132, 132'.

Similar to the process as shown in FIG. 4, the quantized transform coefficients 110 or $c(i,j)$ are inverse quantized in the inverse quantization blocks 20 to obtain inverse quantized transform coefficients 120 or $d_1(i,j)$ and 120' or $d_2(i,j)$. Each of these coefficients $d_1(i,j)$ and $d_2(i,j)$ are scaled with $\alpha_1(t)$ and $\alpha_2(t)$, respectively, in blocks 22, 22' to become scaled coefficients 122, 122'. The resulting coefficients are summed by a summing device 24. The summing result $d_{12}(i,j)$ is denoted by reference numeral 124. Meanwhile, the predicted frames 136, or $R_1(x+\Delta x_1, y+\Delta y_1, t-1)$ and 136' or $R_2(x+\Delta x_2, y+\Delta y_2, t-1)$ are subjected to transform coding in the Transform blocks 38, 38'. Furthermore, using the motion-vectors of the first video-clip and the reconstructed frames of the second video-clip, a reference block 137' $R_2(x+\Delta x_1, y+\Delta y_1, t-1)$ is obtained through the Motion Compensation prediction block 36'. The reference block 137' is also subjected to transform coding by a transform block 39'. After the transform operations, transform coefficients 138, 138' and 139', respectively, of $R_1(x+\Delta x_1, y+\Delta y_1, t-1)$, $R_2(x+\Delta x_2, y+\Delta y_2, t-1)$ and $R_2(x+\Delta x_1, y+\Delta y_1, t-1)$ are scaled with $(\alpha_1(t-1) - \alpha_1(t))$, $\alpha_2(t-1)$, and $-\alpha_2(t)$, respectively. The scaled transform coefficients are then subtracted from $d_{12}(i,j)$ in the summing block 25. The final resulting coefficients 125 or $e(i,j)$ are then quantized in the quantization block 26. Finally the quantized coefficients 126 are sent to a multiplexing unit 70 which performs entropy coding and multiplexing with other required information to produce a valid compressed video bitstream 170.

It should be understood that it is possible to combine the inverse quantization, scaling and quantization blocks or to combine the scaling and quantization blocks into a single coding block.

This process is repeated for both luminance and chrominance components of the video bitstream.

In typical applications, the above-described process can be further improved. For example, it is possible to allow only the selected transition frames to go through the method of producing edited bitstream 170, according to the present invention. For frames that are not transition frames, the operations can be skipped. This improvement process can be carried out by setting one of the weighting parameters in the above-described case to 0: $\alpha_1(t)=0$ or $\alpha_2(t)=0$. When $\alpha_2(t)=0$, there is no need to compute the transform coefficients 138' of $R_2(x+\Delta X_2, y+\Delta y_2, t-1)$. Likewise, when $\alpha_2(t-1)=0$, there is no need to compute 137', or $R_2(x+\Delta x_1, y+\Delta y_1, t-1)$. When $\alpha_1(t-1)=\alpha_1(t)$, there is no need to compute the transform coefficients 138 of $R_1(x+\Delta x_1, y+\Delta y_1, t-1)$.

When $\alpha_2(t-1)=\alpha_2(t)$, the transform coefficients of $R_2(x+\Delta x_2, y+\Delta y_2, t-1)$ and $R_2(x+\Delta x_1, y+\Delta y_1, t-1)$ need not be computed separately in different coding blocks, but they can be computed as follows. After computing both $R_2(x+\Delta x_2, y+\Delta y_2, t-1)$ and $R_2(x+\Delta x_1, y+\Delta y_1, t-1)$, the block $R_2(x+\Delta x_2, y+\Delta y_2, t-1)$ is subtracted from $R_2(x+\Delta x_1, y+\Delta y_1, t-1)$. The difference is subjected to transform coding in one of the transform blocks, such as the block 39'. The results are scaled by $\alpha_2(t-1)$ or $\alpha_2(t)$, and the scaled result is fed to the summing block 25. The remaining steps are identical to the process as described in conjunction with FIG. 5 above.

Sliding Transitional Effect

Sliding transitional effect, also known as "wipe" effect, makes one video clip slide into the other during transition. This can be accomplished by assigning appropriate weights $\alpha(x,y,t)$ that are dependent on the spatial location (x,y) in the frame. Furthermore, for the frames $V_1(x,y,t)$, we set weights $\alpha_1(x,y,t)=0$ and $\alpha_1(x,y,t)=1$ in order to dictate which parts of frame 1 to be included in the sliding transition. Likewise, the setting $\alpha_2(x,y,t)=0$ and $\alpha_2(x,y,t)=1$ dictates which parts of the frame are to be included in frame 2.

Logo Insertion

Figure 6:
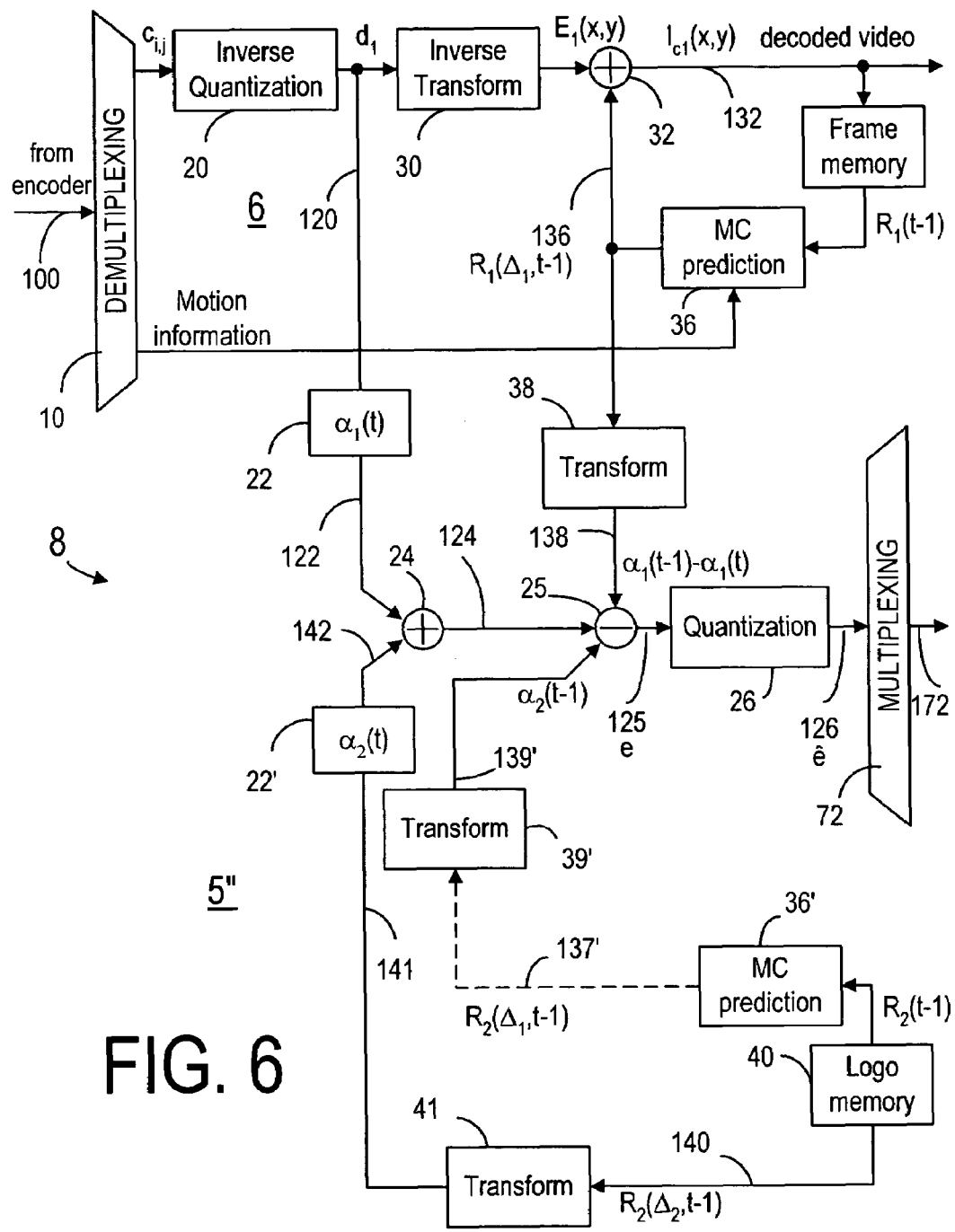
FIG. 6 is a block diagram illustrating an embodiment of the compressed domain approach to logo insertion with blending, according to the present invention.

Logo insertion can be accomplished in different ways. One way is logo insertion with blending, as shown in FIG. 6. Alternatively, logo insertion can be carried out without blending, as shown in FIG. 7.

In logo insertion with blending, the transform coefficients 120 from one of decoder (see FIG. 5) are replaced by the transform coefficients of the logo in a logo memory 40, as shown in FIG. 6. As shown, the logo frames or sequence 140 is transformed into transform coefficients 141 by a transform block 41. The transform coefficient 141 and the coefficient 120 are summed by the summing block 24 after scaling. At the same time, the logo frames are processed by a Motion Compensation prediction block 36' to produce the predicted frames 137'. The result is transformed into transform domain coefficients 139'. The remaining steps are similar to those depicted in FIG. 5.

Figure 7:
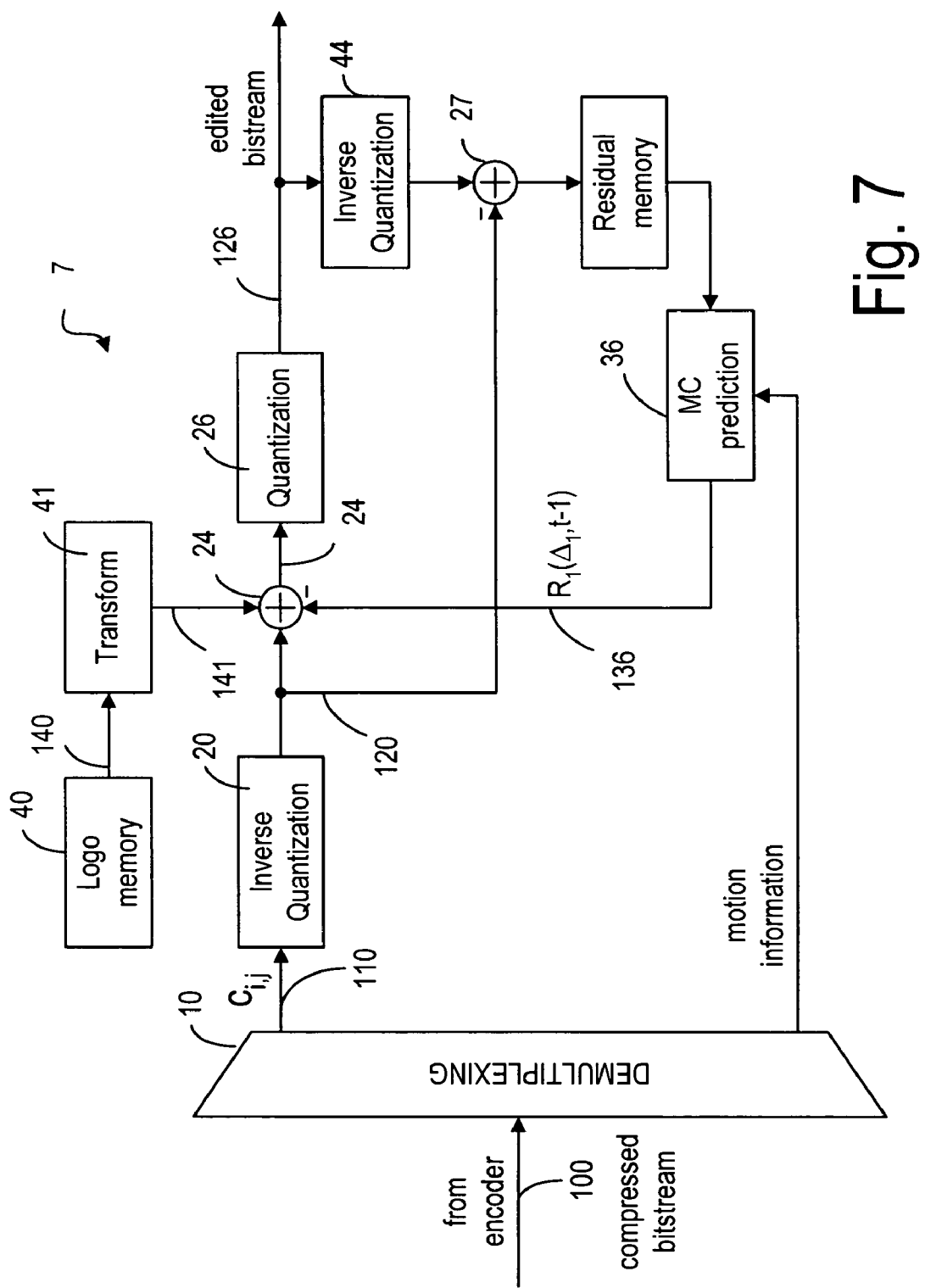
FIG. 7 is a block diagram showing an embodiment of the compressed domain approach to logo insertion.
Figure 10:
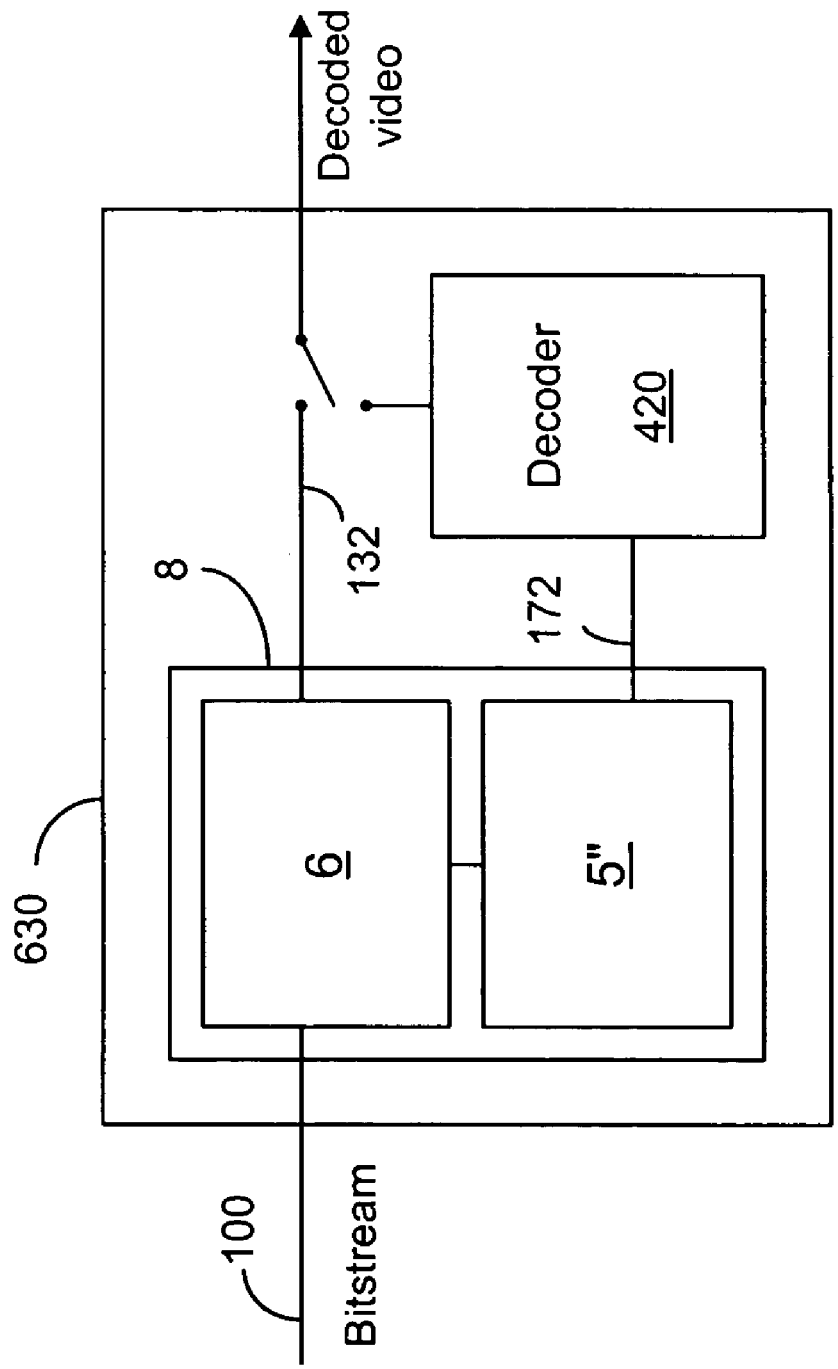
FIG. 10 is a block diagram showing another expanded video decoder, which can be used for compressed-domain video editing, according to the present invention.

Logo insertion without blending is shown in FIG. 7. As shown, the transform coefficients 141 are mixed with the inverse quantized transform coefficients 120 from the compressed bitstream 100 as well as the predicted frames based on the edited bitstream 126.

Superposition of Multiple Sequences or Frames

In the above-described editing processes, the number of input sequences, or N, is set to 2 (Equation 1). Similarly, the number of frames, or n, for use in motion prediction is also set to 2. However, the method of transform domain editing, according to the present invention, can be generalized such that the number of frames can be extended from n=2 to n=N, with N being a positive integer larger than 2.

Figure 1:
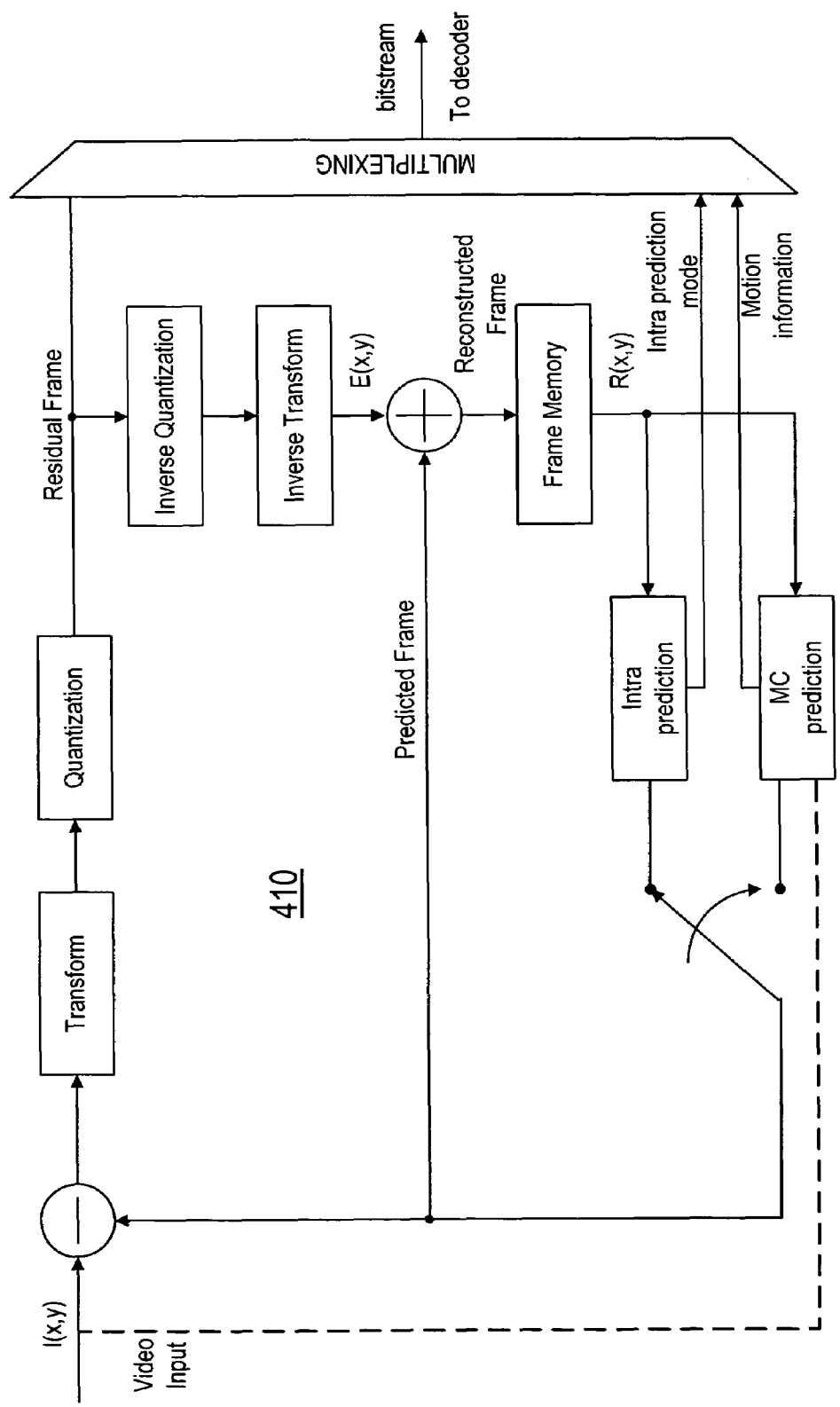
FIG. 1 is a block diagram illustrating a prior art video encoder process.

The compressed-domain editing modules as shown in FIGS. 4 to 7 can be incorporated into conventional encoders and decoders as shown in FIGS. 1 and 2. For example, a conventional encoder 410 can be operatively connected to an editing module 5, 5' or 7 of the present invention. As shown in FIG. 8, the expanded encoder 610 has a switch to select which bitstream to be sent to a decoder. Without editing, the original bitstream 100 is sent. With editing, the edited bitstream 170 is sent. As such, the expanded encoder 610 can be used as a typical encoder, or it can be used for compressed-domain video editing.

Each of the editing modules 5, 5' and 7 can also be incorporated in an expanded decoder 620 as shown in FIG. 9. As shown, the decoder 420 can accept an original bitstream 100, or an edited bitstream 170 from the editing module 5, 5' or 7. As such, the expanded decoder 620 can be used as a typical decoder, or it can be used for compressed-domain video editing.

The editing module 8 of FIG. 6 can also be used along with a conventional decoder 420 in an expanded decoder 630. As shown, the decoded video sequences of the original bitstream 100 can be obtained directly from the upper part 6 of the editing module 8 (see FIG. 6). Alternatively, the bitstream 100 can be edited by the lower part 5" of the editing module 8.

Figure 11A:
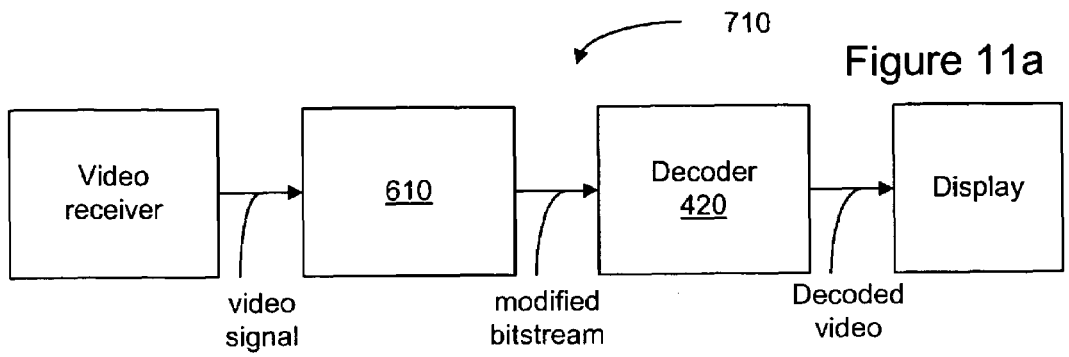
FIG. 11a is a block diagram showing an electronic device having a compressed-domain video editing device, according to the present invention.
Figure 11B:
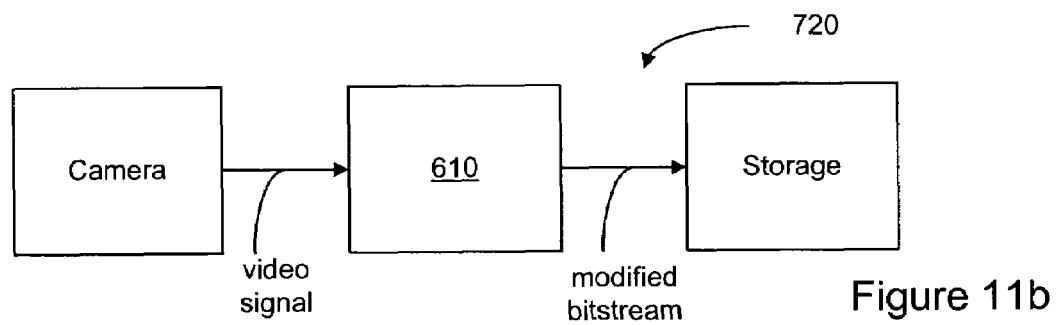
FIG. 11b is a block diagram showing another electronic device having a compressed-domain video editing device, according to the present invention.
Figure 11C:
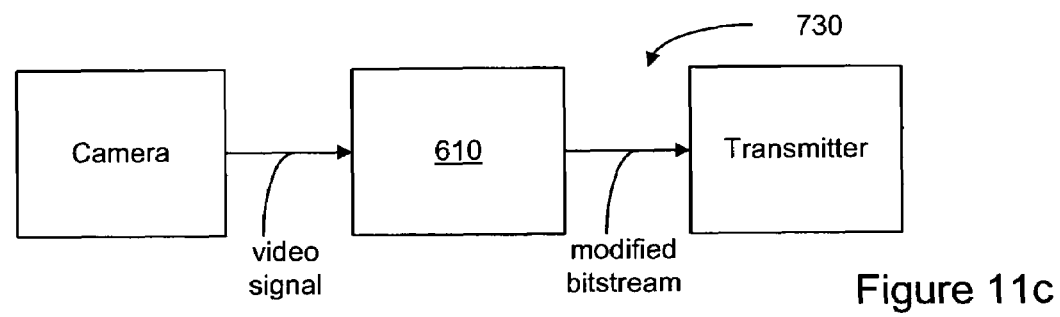
FIG. 11c is a block diagram showing yet another electronic device having a compressed-domain video editing device, according to the present invention.
Figure 11D:
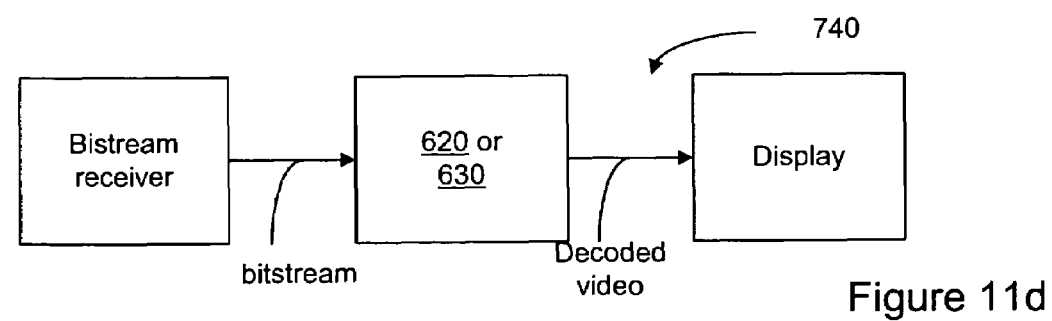
FIG. 11d is a block diagram showing still another electronic device having a compressed-domain video editing device, according to the present invention.

The expanded encoder 610 can be integrated into an electronic device 710, 720 or 730 to provide compressed domain video editing capability to the electronic device, as shown separately in FIGS. 11a to 11c. As shown in FIG. 11a, the electronic device 710 comprises an expanded encoder 610 to receive video input. The bitstream from the output of the encoder 610 is provided to a decoder 420 so that the decoded video can be viewed on a display, for example. As shown in FIG. 11b, the electronic device 720 comprises a video camera for taking video pictures. The video signal from the video camera is conveyed to an expanded encoder 610, which is operatively connected to a storage medium. The video input from the video camera can be edited to achieve one or more video effects, as discussed previously. As shown in FIG. 11c, the electronic device 730 comprises a transmitter to transmit the bitstream from the expanded encoder 610. As shown in FIG. 11d, the electronic device 740 comprises a receiver to receive a bitstream containing video data. The video data is conveyed to an expanded decoder 620 or 630. The output from the expanded decoder is conveyed to a display for viewing. The electronic devices 710, 720, 730, 740 can be a mobile terminal, a computer, a personal digital assistant, a video recording system or the like.

Figure 13:
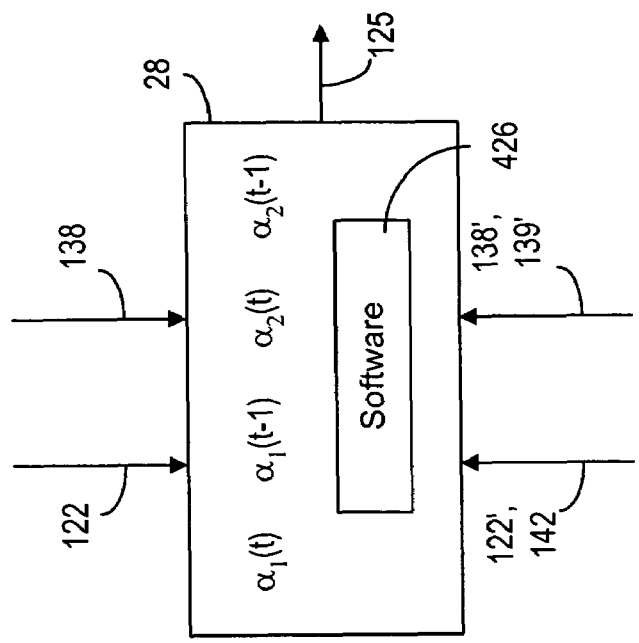
FIG. 13 is a schematic representation showing another software program for providing the editing effects.
Figure 12:
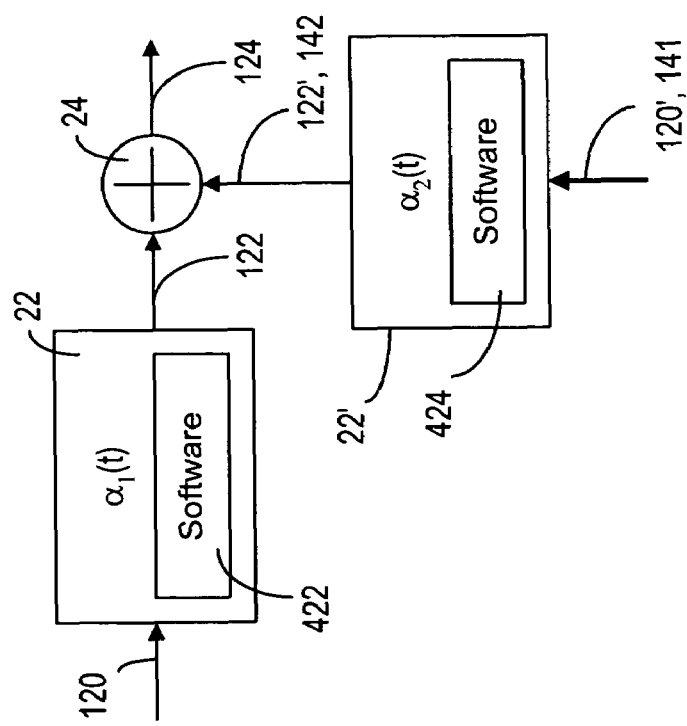
FIG. 12 is a schematic representation showing the software programs for providing the editing effects.

It should be understood that video effect provided in blocks 22, 22', as shown in FIGS. 4, 5 and 6 can be achieved by software programs 422, 424, as shown in FIG. 12. For example, these software programs have a first code for providing editing data indicative of $\alpha(x, y, t)$ and a second code for applying this editing data to the transform coefficients d(x, y, t) by a multiplication operation. The second code can also have a summing operation to combine the scaled transform coefficients 122, 122', 142. Moreover, the summing operation in both the block 24 and the block 25 (see FIGS. 5 and 6) can be carried out by a software program 426 in a summing module 28, as shown in FIG. 13.

In sum, the present invention provides a method and device for editing a bitstream carrying video data in a video sequence. The editing procedure includes:

decoding the bitstream to obtain quantized transform coefficients of the video sequence;

inversely quantizing the quantized coefficients to obtain transform coefficients;

modifying the transform coefficients in the transform domain;

quantizing the modified transform coefficients.

The transform coefficients can be modified by combining the transform coefficients with other transform coefficients by way of weighted summation, for example. The other transform coefficients can be obtained from the same video sequence or from a different video sequence. They can also be obtained from a memory via a transform module.

Many or all of these method steps can be carried out by software codes in a software program.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method comprising:
   acquiring in a video decoder video data indicative of a plurality of first transform coefficients from a first bitstream;
   acquiring in the video decoder video data indicative of a plurality of second transform coefficients different from the first transform coefficients,
   obtaining first predicted video data based on motion information from a second bitstream and a previously constructed part of the second bitstream;
   performing transform operation on the first predicted video data for obtaining a plurality of third transform coefficients; and
   combining the first transform coefficients, the second transform coefficients and the third transform coefficients for achieving a video effect.

2. A method according to claim 1, further comprising:
   obtaining second predicted video data based on motion information from the first bitstream and a previously constructed part of the first bitstream; and
   performing transform operation on the second predicted video data for obtaining a plurality of fourth transform coefficients, wherein said combining also includes the fourth transform coefficients.

3. A method according to claim 1, further comprising:
   obtaining second predicted video data based on motion information from the second bitstream and a previously constructed part of the second bitstream; and
   performing transform operation on the second predicted video data for obtaining a plurality of fourth transform coefficients, wherein said combining also includes the fourth transform coefficients.

4. A method according to claim 1, further comprising:
   obtaining second predicted video data based on motion information from the second bitstream and a previously constructed part of the second bitstream;
   performing transform operation on the second predicted video data for obtaining a plurality of fourth transform coefficients;
   obtaining third predicted video data based on motion information from the first bitstream and a previously constructed part of the first bitstream; and
   performing transform operation on the third predicted video data for obtaining a plurality of fifth transform coefficients, wherein said combining also includes the fourth transform coefficients and fifth transform coefficients.

5. A method according to claim 1, further comprising:
   scaling the first transform coefficients and the second transform coefficients prior to said combining.

6. A method according to claim 1, further comprising:
   scaling the first transform coefficients for obtaining scaled first transform coefficients, and scaling the second transform coefficients for obtaining scaled second transform coefficients, prior to said combining, and wherein said combining comprises:
   summing the scaled first transform coefficients to the scaled second transform coefficients for obtaining a summed data; and
   subtracting the third transform coefficients from the summed data.

7. An apparatus configured to acquire video data indicative of a plurality of first transform coefficients from a first bitstream and video data indicative of a plurality of second transform coefficients different from the first transform coefficients, said apparatus comprising:
   a motion compensated prediction processor for obtaining first predicted video data based on motion information from the second bitstream and a previously constructed part of the second bitstream;
   a transform processor for performing transform operation on the first predicted video data for obtaining a plurality of third transform coefficients; and
   a combining processor for combining the first transform coefficients, the second transform coefficients and the third transform coefficients for achieving a video effect.

8. The apparatus of claim 7, further comprising:
   a further compensated prediction processor for obtaining second predicted video data based on motion information from the first bitstream and a previously constructed part of the first bitstream; and
   a further transform processor for performing transform operation on the second predicted video data for obtaining a plurality of fourth transform coefficients, wherein the combining processor also includes the fourth transform coefficients in said combining.

9. An apparatus according to claim 7, wherein the motion compensated prediction processor is configured for obtaining second predicted video data based on motion information from the second bitstream and a previously constructed part of the second bitstream; and
   a further transform processor for performing transform operation on the second predicted video data for obtaining a plurality of fourth transform coefficients, wherein said combining also includes the fourth transform coefficients.

10. An apparatus according to claim 7, wherein the motion compensated prediction processor is configured for obtaining second predicted video data based on motion information from the second bitstream and a previously constructed part of the second bitstream;
    a second transform processor for performing transform operation on the second predicted video data for obtaining a plurality of fourth transform coefficients, said apparatus further comprising:
    a further motion compensated prediction processor for obtaining third predicted video data based on motion information from the first bitstream and a previously constructed part of the first bitstream; and
    a third transform processor for performing transform operation on the third predicted video data for obtaining a plurality of fifth transform coefficients, wherein the combining processor also includes the fourth transform coefficients and fifth transform coefficients in said combining.

11. An apparatus according to claim 7, further comprising:
a first scaling processor for scaling the first transform coefficients; and
a second scaling processor for scaling the second transform coefficients before the combining processor combines the first transform coefficients, the second transform coefficients and the third transform coefficients.

12. An apparatus according to claim 7, further comprising:
a first scaling processor for scaling the first transform coefficients for obtaining scaled first transform coefficients; and
a second scaling processor for scaling the second transform coefficients for obtaining scaled second transform coefficients before the combining processor combines the first transform coefficients, the second transform coefficients and the third transform coefficients in said combining, and wherein the combining processor comprises:
a first summing processor for summing the scaled first transform coefficients with the scaled second transform coefficients for obtaining a summed data; and
a second summing processor for subtracting the third transform coefficients from the summed data for providing modified transform coefficients.

13. An apparatus according to claim 12, further comprising:
a quantization processor for quantizing the modified transform coefficients.

14. An apparatus according to claim 7, further comprising:
a memory device for providing stored data indicative of the second transform coefficients; and
a further transform processor for perform transform operation on the stored data for providing the second transform coefficients.

15. A computer readable storage medium embodied therein a software program for use in an apparatus, the apparatus configured to acquire video data indicative of a plurality of first transform coefficients from a first bitstream and video data indicative of a plurality of second transform coefficients different from the first transform coefficients, and further configured to obtain first predicted video data based on motion information from the second bitstream and a previously constructed part of the second bitstream and to perform transform operation on the first predicted video data for obtaining a plurality of third transform coefficients, said software program comprising:
programming code for combining the first transform coefficients, the second transform coefficients and the third transform coefficients for achieving a video effect.

16. A computer readable storage medium according to claim 15, wherein the apparatus is also configured to obtain second predicted video data based on motion information from the first bitstream and a previously constructed part of the first bitstream and to perform transform operation on the second predicted video data for obtaining a plurality of fourth transform coefficients, the software program farther comprising:
programming code for including the fourth transform coefficients in said combining.

17. A computer readable storage medium according to claim 15, wherein the apparatus is also configured to obtain second predicted video data based on motion information from the second bitstream and a previously constructed part of the second bitstream and to perform transform operation on the second predicted video data for obtaining a plurality of fourth transform coefficients, the software program further comprising:
programming code for including the fourth transform coefficients in said combining.

18. An apparatus comprising:
means for acquiring video data indicative of a plurality of first transform coefficients from a first bitstream;
means for acquiring video data indicative of a plurality of second transform coefficients different from the first transform coefficients,
means for obtaining first predicted video data based on motion information from the second bitstream and a previously constructed part of the second bitstream;
means for performing transform operation on the first predicted video data for obtaining a plurality of third transform coefficients; and
means for combining the first transform coefficients, the second transform coefficients and the third transform coefficients for achieving a video effect.

19. An apparatus according to claim 18, further comprising:
means for obtaining second predicted video data based on motion information from the first bitstream and a previously constructed part of the first bitstream; and
means for performing transform operation on the second predicted video data for obtaining a plurality of fourth transform coefficients, wherein said combining also includes the fourth transform coefficients.

20. An apparatus according to claim 18, further comprising:
means for obtaining second predicted video data based on motion information from the second bitstream and a previously constructed part of the second bitstream; and
means for performing transform operation on the second predicted video data for obtaining a plurality of fourth transform coefficients, wherein said combining also includes the fourth transform coefficients.

21. An apparatus according to claim 18, further comprising:
means for obtaining second predicted video data based on motion information from the second bitstream and a previously constructed part of the second bitstream;
means for performing transform operation on the second predicted video data for obtaining a plurality of fourth transform coefficients;
means for obtaining third predicted video data based on motion information from the first bitstream and a previously constructed part of the first bitstream; and
means for performing transform operation on the third predicted video data for obtaining a plurality of fifth transform coefficients, wherein said combining also includes the fourth transform coefficients and fifth transform coefficients.

* * * * *

UNITED STATES PATENT AND TRADEMARK OFFICE
CERTIFICATE OF CORRECTION

| | | |
|---|---|---|
| PATENT NO. | : 7,599,565 B2 | Page 1 of 1 |
| APPLICATION NO. | : 10/798825 | |
| DATED | : October 6, 2009 | |
| INVENTOR(S) | : Ragip Kurceren et al. | |

It is certified that error appears in the above-identified patent and that said Letters Patent is hereby corrected as shown below:

1. In column 15, lines 19 and 20, claim 12, lines 9 and 10 "combing" should be -- combining --.

2. In column 15, line 34, claim 14, line 4 "perform" should be -- performing --.

3. In column 15, line 44, claim 15, line 8, second occurrence of "the" should be deleted.

Signed and Sealed this

Ninth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,599,565 B2  
APPLICATION NO. : 10/798825  
DATED : October 6, 2009  
INVENTOR(S) : Kurceren et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1126 days.

Signed and Sealed this

Twenty-eighth Day of September, 2010

David J. Kappos  
*Director of the United States Patent and Trademark Office*